Figure 1:
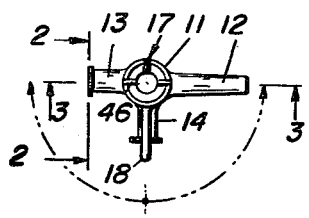

May 25, 1965  A. HARAUTUNEIAN  3,185,179

DISPOSABLE VALVE

Filed May 5, 1961

INVENTOR
ANDREW HARAUTUNEIAN
BY
Robert T. Merrick

United States Patent Office 3,185,179
Patented May 25, 1965

3,185,179
DISPOSABLE VALVE
Andrew Haraurunian, Gardena, Calif., assignor to Pharmaseal Laboratories, Glendale, Calif., a corporation of California
Filed May 5, 1961, Ser. No. 108,127
20 Claims. (Cl. 137—625.47)

This invention relates to a valve and particularly to an inexpensive valve for disposable or one-time use in medical and surgical applications.

The metal valves usually used for medical applications have small core passages. In the case of three-way valves, these small core passages usually intersect at angles of 90° to each other. These valves are quite expensive and are therefore cleaned and re-used many times. For medical uses, the valves must be scrupulously clean, but this is difficult becasue of the very small, tortuous, intersecting core passages. Moreover, the passages may become clogged with dried blood, mucous, or tissues, which are very hard to remove. Failure to adequately clean the valves can cause patients to have severe pyrogenic reactions.

To assure smooth action, the metal valves must usually be lubricated with stopcock or valve grease, which tends to plug the small core passages. In some applications, such as spinal taps, large amounts of such lubricants are undesirable. Attempts to use limited amounts of lubricants make the valves difficult to adjust and they may sometimes freeze during an important and critical procedure.

It has been suggested to replace the metal valves with inexpensive, disposable valves made of polyethylene or similar thermoplastic materials. Such valves would be particularly useful for spinal taps, for administering diagnostic agents or medicaments, draining body cavities, or for other uses in which cleaning and re-using a valve is undesirable. However, serious problems are encountered in the design of such valves because the usual methods of holding the core in the body are unsatisfactory for plastic valves. Also, the polyethylene plastic tends to relieve under tension, and thus allows the valve to loosen and to leak in use.

To prevent leakage, large, interlocking surfaces are sometimes provided to urge the valve cores tightly into the valve bodies. However, the resultant friction between the core and the body results in a rough action which makes the valve difficult to adjust. Also, the redesign of the valves to prevent leakage often results in a valve which is different in configuration and unfamiliar to the operators. This increases the possibility of making an error and severely limits the use of such valves.

It is therefore an object of this invention to provide an inexpensive, disposable, plastic valve which operates in a manner similar to the metal valves previously used.

A further object of the invention is to provide an effective, leakproof valve which operates like those now in use, but which is so inexpensive that it can economically be discarded after a single use.

Another object of the invention is to provide a plastic valve having an improved means for holding the core in the valve body.

A further object of the invention is to provide a lightweight, plastic valve which is easy to mold and to assemble.

A further object of the invention is to provide a heat-sterilizable, disposable valve.

A still further object of the invention is to provide a method for making an improved plastic valve.

Figure 2:
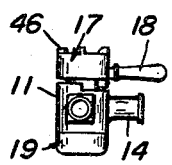
Figure 4:
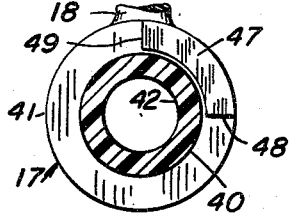
Figure 3:
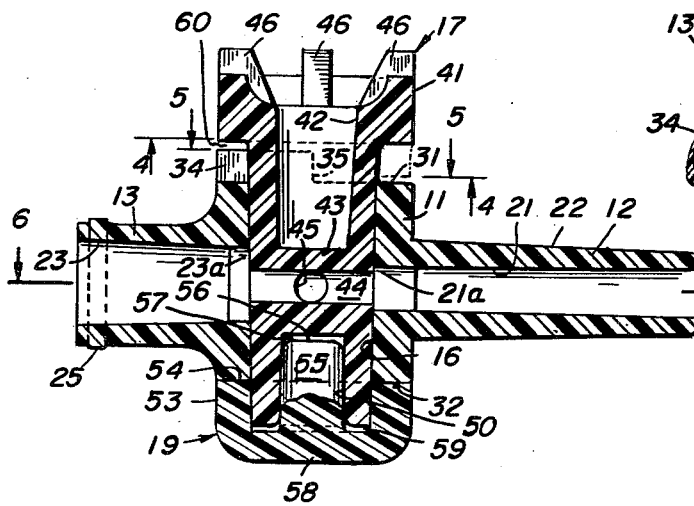
Figure 5:
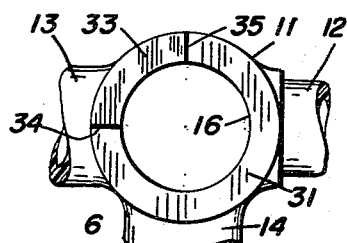
Figure 6:
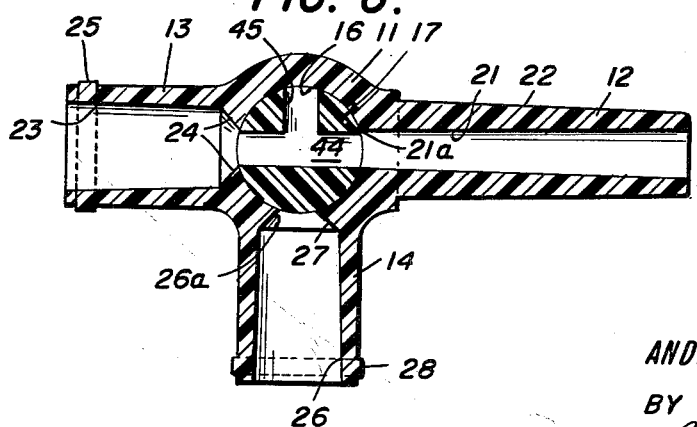
Figure 7:
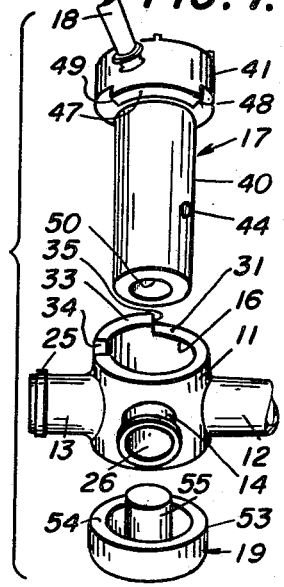

Other objects and advantages of the invention will be apparent from the description of the preferred example of the invention, given in connection with the accompanying drawings, in which:

FIGURE 1 is a top view of the invention;
FIGURE 2 is a side elevational view on the line 2—2 FIGURE 1;
FIGURE 3 is an enlarged sectional view, partially in elevation, on the line 3—3 of FIGURE 1;
FIGURE 4 is a sectional view of the valve core on the line 4—4 of FIGURE 3;
FIGURE 5 is a plan view of the valve body only on the line 5—5 of FIGURE 3;
FIGURE 6 is a sectional view on the line 6—6 of FIGURE 3; and
FIGURE 7 is an exploded elevational view of the invention.

As shown in the drawings, the valve has a cylindrical body 11, from which the tubular extensions 12, 13, and 14 project. These extensions all lie in the same horizontal plane and are substantially perpendicular to body 11. A tapered axial bore 16 passes longitudinally through body 11 and a core 17 fits tightly and rotatably therein. The outer surface of core 17 tapers, for example, at about ½° to the axis, to match the taper of bore 16. A portion of core 17 extends beyond body 11 on each end. The top extending portion of core 17 has a handle 18, while the bottom portion receives a retaining member 19. It will be noted in the illustrated embodiment that an extension toward which handle 18 points is closed.

The outer surface 22 of tubular extension 12 is tapered to provide a male Luer taper, adapted to fit into the female Luer taper of a hypodermic needle hub or other connector. Extension 12 is longer than extensions 13, 14, thus allowing two stopcocks to be connected in tandem without interference of their respective handles 18. The inner surface of extension 12 is also tapered and defines an axial passage 21. Passage 21 is open at one end and connects with a port 21a, passing through the wall of body 11, at the other end.

Tubular extension 13 has a passage 23 axially aligned with passage 21, and connecting with port 23a in body 11. The vertical walls 24 of port 23a taper inwardly to reduce the width of the port and to provide a maximum body surface between the respective ports. The walls defining passage 23 are preferably tapered inwardly and adapted to serve as a female Luer taper connection. A locking flange 25 is provided on the outer surface of extension 13.

The axis of tubular extension 14 is perpendicular to the respective axes of extensions 12 and 13 but lies in the same horizontal plane. The walls of extension 14 also define a tapered axial passage 26 which connects with a port 26a in body 11. The vertical walls 27 defining port 26a taper inwardly so as to reduce the width of the port. The outer surface of extension 14 has a locking flange 28 adapted to receive a Luer lock adapter, such as commonly provided on hypodermic syringes.

One end of body 11 terminates in a top surface 31 and the other end in a flat, annular bottom surface 32. An arcuate boss 33 extends upwardly from a portion of top surface 31 and provides two shoulders or stops 34, 35.

The valve core 17 has a tapered outer surface 40 adapted to fit tightly within the tapered bore 16 of body 11. The extending upper end of core 17 is provided with an enlarged head 41. An axial bore 42 enters the top of core 17 and terminates in a transverse wall 43, defining a passage 44 extending diametrically across core 17. A second passage 45 meets passage 44 at an angle of about 90° and extends from said passage to the core surface.

On the top surface of enlarged head 41, a boss or projection 46 is provided, aligned with and indicating the position of each of the respective ends of passages 44 and 45. A depending, arcuate flange 47 extends downwardly from head 41 and provides two shoulders or stops 48, 49 adapted to seat against stops 34, 35 in certain predetermined core positions.

The lower end of core 17 extends beyond body 11 and is provided with a cap-shaped, retaining member 19. Retaining member 19 has a disc-like body 58 and a skirt 53, the latter extending upwardly and terminating in a flat, annular top surface 54 which bears against the bottom surface 32 of body 11. The lower end of core 17 has a bore 50, the walls of which taper inwardly towards the transverse wall 43. Retaining member 19 preferably also has tapered plug 55, extending from the body 58 and concentric with skirt 53. Plug 55 is preferably longer than skirt 53 and is wedged tightly into bore 50. The tapers of bore 50 and plug 55 are preferably on the order of 1° to the respective axis.

The respective dimensions of retaining member 19 depend to some degree on the materials used and on their respective resistance to deformation. In general, however, the outside diameter of plug 55 should be approximately 0.001 inch larger than the corresponding diameter of bore 50, and the inside diameter of the skirt 53 should be about 0.001 inch less than the corresponding outside diameter of core 17. In this way, an extremely tight fit between the retaining member 19 and core 17 can be obtained, while still leaving a small space 57 between the top end 56 of plug 55 and transverse wall 43. Spaces 59 and 60 also are left between the inner surface of retaining member body 58 and the lower end of core 17, and between the lower surface of head 41 and the top body surface 31.

Body 11, core 17, and retaining member 19 are preferably made by molding. Core 17 and retaining member 19 should be made of a rigid plastic having a high degree of dimensional stability at temperatures below about 300° F. Polyacetal plastics, such as Delrin, have proven most satisfactory. Polychloroether plastics, such as Penton, or polycarbonates, such as Lexan, can also be used. Body 11 is preferably made of a rigid plastic material which has a high degree of rigidity at room temperatures, but which loses its rigidity somewhat at temperatures between 230° and 260° F., and therefore can be deformed slightly by the outward force of core 17. Nylon is a good example of such a material and has been found quite satisfactory.

Before the valve is assembled, a very thin layer of a fluid, linear polymer of trifluorochloroethylene having an average molecular weight of from about 850 to about 1250, is applied to core 17. The thin layer of lubricant is preferably applied by merely dipping the cores in a perchloroethylene solution containing about 15% by weight of trifluorochloroethylene oil. Trichloroethylene or carbon tetrachloride solutions can also be used. After dipping, the solvent is allowed to evaporate. The core is thus covered with a very thin layer, containing only 5 to 10 milligrams, of the lubricant.

The valve of my invention is easily assembled by placing core 17 into body 11 and retaining member 19 and then pressing core 17 toward member 19. A force of about 200 pounds has been found sufficient to drive the lower end of core 17 tightly into member 19. The vertical elongation of ports 23a and 26a compensates for small variations in the size of the respective parts. The assembled valve is then packaged and heat treated at a temperature of 240° to 260° F. Either steam or dry heat may be used, but steam heat will simultaneously sterilize the valve. This treatment relieves the thin-walled nylon body slightly, making the valve easier to turn and helping to alleviate any surface discontinuities developed during molding. If desired, the valve can be tightened after relief of the nylon part by again pushing core 17 further into retaining member 19.

There are obviously many uses for the disposable medical valve described above. One such use is in the performance of a lumbar or spinal puncture. This procedure is performed for diagnostic purposes and includes measurement of spinal pressure and obtaining of samples for cultures, cell counts, serology and protein, sugar and chloride analysis.

In the performance of a lumbar puncture, a lumbar puncture needle, with stylet in place, is inserted into the third lumbar interspace and the stylet is then withdrawn from the needle. As soon as suitable fluid appears, a valve with handle 18 in an off position is connected by inserting tubular extension 12 tightly into the hub of the lumbar puncture needle with extension 14 directed upwardly. The male tapered connector of a manometer is then inserted into passage 26 and valve core 17 is turned to connect passage 21 with passage 26. After measurement of the spinal pressure in the usual manner, valve core 17 is turned to connect passage 21 with passage 23 and the desired samples are collected from extension 13. The valve and manometer are then disconnected from the needle, the stylet reinserted, the needle carefully but quickly removed, and a dressing applied to the wound. The valve is then discarded since its cost is less than the cost of disassembling, cleaning and sterilizing the valve.

In the foregoing description, I have described a preferred embodiment of the invention in considerable detail for the purpose of illustration. It is understood, of course, that many of the structural details of the invention may be varied by those skilled in the art without departing from the spirit of my invention.

I claim:

1. A disposable plastic valve comprising: a body having a tapered bore; inlet and outlet tubes projecting from said body; a flat annular bearing surface on the bottom of the body; a tapered valve core telescoping into the body and rotatable therein; means defining at least one transverse passage through said core, said passage being adapted to connect an inlet tube with an outlet tube; a portion of the core extending beyond the body; a retaining member axially press fitted to said extending core portion, which retaining member has an integral skirt which wedges tightly around the periphery of the extending core portion; and a bearing surface on the extremity of the retaining member skirt pressing against the annular bearing surface on the valve body and holding the core tightly in the body.

2. A disposable plastic valve as set forth in claim 1 wherein the valve core tapers from a large to a small end with a portion of the core adjacent the small end extending beyond the valve body, which portion has an axial bore therein; and a tapered plug extending from the retaining member into said axial bore and wedged tightly therein.

3. A disposable plastic valve comprising: a body having a tapered bore; a tapered core rotatably seated in said bore and extending above and below said body; a handle associated with one of the extending ends of the core; an inwardly tapering bore in the other end of the core; a retaining member associated with said end of the core, said member having an integral tapered plug wedged tightly into the core bore; and means integral with said plug and extending beyond the periphery of said core, said means bearing against the bottom surface of the body and urging the core tightly into the body.

4. A valve as set forth in claim 3 wherein said last-named means comprises a skirt fitting tightly around said other end of the core; and said end of the core is wedged between said skirt and the tapered plug.

5. A disposable valve comprising: a thin-walled body having a tapered bore; a core telescoping into the body bore and rotatable therein, said core being made of a plastic material having a high degree of rigidity at temperatures below 300° F., and the body being made of a rigid plastic material which loses its rigidity somewhat at temperatures above 230° F. but below the softening point, whereby the thin-walled body will relieve radially outwardly to alleviate surface discontinuities between said core and the body when the valve is subject to sterilization temperatures of approximately 240° F. to 260° F., which thin-walled body after relieving regains its rigidity upon return to room temperatures and maintains a precise rotatable fit with said core.

6. A disposable plastic valve as set forth in claim 5 wherein the core is made of polyacetal plastic and the body is made of nylon.

7. A disposable plastic valve as set forth in claim 5 wherein the core is coated with 5–10 milligrams of a fluid trifluorochloroethylene polymer.

8. A disposable plastic valve as set forth in claim 7 wherein the fluid trifluorochloroethylene polymer is in the form of a very thin, uniform layer remaining after evaporation of a solvent carrying said polymer.

9. A disposable, three-way plastic valve comprising: a molded body member having a tapered bore, a top surface and a flat annular bottom surface; three tubular extensions projecting at 90° to the body and to each other, ports in the walls of said body connecting the bore with said extensions; an arcuate boss extending upwardly from the top body surface and providing two radial stops; a tapered core member telescoped into the body bore; a head, having a handle, on one end of said core member; a portion of the other end of the core member extending beyond the body member; a T-shaped transverse passage in the core member, said passage being adapted to connect any one of the body member ports to any other of said ports upon rotation of the core member; an axial bore in the extending core portion; a retaining member axially press fitted to said extending core portion; a skirt integral on said retaining member wedged tightly around the periphery of the extending core portion and terminating in a bearing surface pressing against the annular bottom surface of the valve body and urging the core tightly into the body; and a tapered plug extending from the retaining member into the axial core bore and wedged tightly therein.

10. A method of making a disposable plastic valve comprising: forming a core member and a cap-like, retaining member of a plastic material having a high degree of rigidity; forming a body member having a bore of a second rigid plastic material which loses its rigidity somewhat at elevated temperatures; dipping said core in a dilute solution of trifluorochloroethylene polymer and evaporating the solvent; pressing the core tightly into the body bore and retaining it there by axially pressing the retaining member onto an extending end of the core; and heat treating the assembled valve at an elevated temperature but substantially below the softening points of the valve materials to relieve the body thereof, and cooling said valve to room temperature to rigidify said relieved body member, thus making the valve easier to turn and alleviating discontinuities on the body bore surface.

11. The method of making a disposable plastic valve as set forth in claim 10 wherein the core is again pressed into the retaining member after the heat-treating step.

12. A disposable plastic valve comprising: a body having a bore therethrough tapering radially inwardly from a first end to a second opposite end of said body; a tapered valve core telescoping into the valve body and rotatable therein; a head on one end of said core; a retaining member axially press fitted on the other end of said core, said retaining member having an integral skirt which is wedged tightly around the periphery of the extending core portion which skirt slideably engages a bearing surface at the second end of said body to firmly retain the tapered core in fluid-tight rotary engagement with said body; a transverse passage in the core; at least two ports in the body wall, said ports being adapted to communicate with the core passage in certain rotational positions of the core, the transverse dimensions of said ports being substantially equal to the transverse dimension of the core passage and the axial dimension of the ports being substantially greater than the axial dimension of the core passage, whereby the core passage communicates with the body ports regardless of small variations in the position of the core in the body.

13. A method of making a plastic valve comprising: forming of a plastic material which loses its rigidity somewhat at elevated temperatures a body member having a bore; forming a core member and a retaining member of a different plastic material which maintains its rigidity at temperatures higher than the plastic material of the body member; pressing the core tightly into the body bore with an end portion of the core extending beyond said body; axially pressing the retaining member onto the extending end portion of the core; heating the valve to temperatures at which the valve body loses slightly its rigidity but at which said core and retaining member do not, said body relieving radially outwardly to precisely conform its inner surface to an outer surface of said core; and cooling said valve to room temperatures where said relieved body regains its rigidity and maintains a precise fit with said core.

14. A method of making a plastic valve as set forth in claim 13 wherein the step of heating the valve to relieve the body member is at temperatures sufficient to simultaneously steam sterilize said valve.

15. A method of making a plastic valve as set forth in claim 14 wherein the heating step is carried out at temperatures from 240° F. to 260° F.

16. A method of making a plastic valve comprising the steps of: forming a plastic body member with a bore therethrough tapering slightly radially inwardly from a first end to a second end thereof, said body having ports communicating with said bore; forming a tapered core member with passages for connecting to ports in said body member; forming a plastic retaining member; inserting said core member into the body member bore from its first end; axially pressing the retaining member onto the core member from a direction of the second end of said bore, said pressing step causing a bearing surface of said retaining member to engage said body member adjacent the second end of its bore with sufficient force to tighten said core firmly in said body member for liquid-tight rotary engagement therewith.

17. A method of making a plastic valve as set forth in claim 16 wherein the core and retaining member are pressed together with an axial force of the order of 200 pounds.

18. A method of making a plastic valve as set forth in claim 16 which includes the step of coating the core member with a solvent containing a trifluorochloroethylene polymer prior to inserting it into the body member bore.

19. A method of making a plastic valve as set forth in claim 18 which includes the step of evaporating the solvent from said core member after the step of coating the core member to leave a uniform film of trifluorochloroethylene polymer.

20. A method of making a plastic valve as set forth in claim 18 wherein the step of coating the core member includes the step of dipping the core in a perchloroethylene solution containing about 15% by weight of trifluorochloroethylene oil.

(References on following page)

References Cited by the Examiner

UNITED STATES PATENTS

| | | | |
|---|---|---|---|
| 904,299 | 11/08 | Best | 251—309 |
| 948,075 | 2/10 | Richard | 251—309 |
| 1,044,648 | 11/12 | Hamrick | 137—616.7 X |
| 1,349,823 | 8/20 | Eimer | 251—309 X |
| 1,777,608 | 10/30 | Englebright | 137—625.41 |
| 2,451,046 | 10/48 | Rembert | 18—47.5 |
| 2,724,867 | 11/55 | Smith | 18—47.5 |
| 2,777,783 | 1/57 | Welch | |
| 2,854,027 | 9/58 | Kaiser et al. | 137—625.41 |
| 2,969,219 | 1/61 | Bunce | 251—368 XR |
| 3,006,558 | 10/61 | Jacobs | 251—368 X |
| 3,057,370 | 10/62 | Hamilton | 251—368 XR |

FOREIGN PATENTS 833,247  4/60  Great Britain.

OTHER REFERENCES

Chemical and Engineering News, volume 30, No. 26, June 30, 1952, pages 2688–2691.

MARTIN P. SCHWADRON, *Acting Primary Examiner.*
MILTON KAUFMAN, *Examiner.*